United States Patent [19]
Winkler et al.

[11] Patent Number: 5,401,008
[45] Date of Patent: * Mar. 28, 1995

[54] CONTROLLABLE MOTOR BEARING

[75] Inventors: Gerold Winkler, Birkenau; Gerd-Heinz Ticks, Waldmichelbach; Ludwig Schmitt, Birkenau, all of Germany

[73] Assignee: Firma Carl Freudenberg, Weinheim, Germany

[*] Notice: The portion of the term of this patent subsequent to Apr. 5, 2011 has been disclaimed.

[21] Appl. No.: 884,366

[22] Filed: May 18, 1992

[30] Foreign Application Priority Data

Jun. 25, 1991 [DE] Germany ............ 41 20 841.2

[51] Int. Cl.$^6$ .................................. F16F 9/08
[52] U.S. Cl. ................... 267/140.13; 267/140.14
[58] Field of Search ............... 267/140.11–140.13, 267/140.3, 140.4, 141.1, 141.2, 141.4, 219, 35, 64.19, 64.23, 64.27, 152, 153; 248/562, 636, 638; 180/300, 312

[56] References Cited

U.S. PATENT DOCUMENTS

| | | | |
|---|---|---|---|
| 2,982,538 | 5/1961 | DeCarbon | 267/64.15 |
| 3,727,899 | 4/1973 | Pemberton | 267/64.19 |
| 4,416,445 | 11/1983 | Coad | 248/562 |
| 4,424,961 | 1/1984 | Takei | 188/379 |
| 4,505,461 | 3/1985 | Kakimoto | 267/140.13 |
| 5,133,573 | 7/1992 | Kijima et al. | 267/220 |
| 5,299,789 | 4/1994 | Winkler et al. | 267/140.12 |

FOREIGN PATENT DOCUMENTS

| | | | |
|---|---|---|---|
| 34 03 002 | 6/1987 | Germany . | |
| 8124841 | 7/1983 | Japan | 267/140.13 |
| 0120934 | 5/1988 | Japan | 180/312 |

Primary Examiner—Robert J. Oberleitner
Assistant Examiner—Chris Schwartz
Attorney, Agent, or Firm—Kenyon & Kenyon

[57] ABSTRACT

A controllable motor bearing consisting of a journal bearing and a support which are connected parallel to one another by means of a first and a second spring element made of rubber. One of the spring elements can be locked in place by an auxiliary mechanism, if necessary. The first spring element is structured in the form of a ring, and has an inside diameter which is larger than the outside diameter of the second spring element. The first spring element overlaps the second spring element at least partially in the axial direction. The auxiliary mechanism consists of a support element which at least partially surrounds the second spring element at a radial distance. The second spring element has a recess which has an expanse and position in the axial direction which cooperates with the support element. A fluid medium can be fed into the recess. The second spring element can be expanded in the area of the recess, as a function of the pressure of the fluid medium, and can be placed against the support element so as not to move.

11 Claims, 4 Drawing Sheets

CONTROLLABLE MOTOR BEARING

The invention relates to a controllable motor bearing which consists of a journal bearing and a support. The bearing and support are connected parallel to one another by first and a second spring elements made of rubber. One of the spring elements can be locked in place by an auxiliary mechanism, if necessary.

A motor bearing is shown in DE-PS 34 03 002. In this disclosure, the bearing's operation is dependant upon the interaction of two spring elements having different spring characteristics and a clutch. The electromagnetically-activated clutch is arranged in series with the relatively stiffer spring element, and this unit is arranged in parallel with the relatively softer spring element. When the clutch is not activated, vibrations with higher frequency and small amplitude are insulated by the relatively softer spring element. When the clutch is activated, a composite spring stiffness is obtained from the spring elements connected by the clutch, allowing the damping of vibrations with low frequency and large amplitude.

In the above arrangement the motor bearing has a complicated internal structure consisting of many individual parts that must be connected; this structure is therefore not very satisfactory from an economic point of view. Also, the large dimensions in the axial direction and the great weight of the installed motor bearing resulting from its design are disadvantageous.

The present invention is a motor bearing designed so that vibrations with a small amplitude are insulated well and large relative movements between the journal bearing and the support are avoided. The present invention is also designed so that the bearing can be easily produced, with fewer parts and in a more economical manner, and at the same time has smaller dimensions and less weight.

In the motor bearing according to the present invention, the first spring element is structured in the form of a ring, and has an inside diameter which is larger than the outside diameter of the second spring element. The first spring element therefore overlaps the second spring element at least partially in the axial direction. The auxiliary mechanism consists of a support element which at least partially surrounds the second spring element radially. The second spring element has a recess which has a width and a position in the axial direction which allows it to cooperate with the support element. A fluid medium can be fed into the recess so that the second spring element can be expanded into the area of the recess, dependant upon the pressure of the fluid medium. The second spring element can be placed against the support element so as not to move. Due to the concentric arrangement of the two spring elements, the bearing has small dimensions in both the axial and the radial direction. The controllable motor bearing has few parts and insulates vibrations at higher frequencies with small amplitude because the second spring element does not rest completely against the circumferential wall of the support element in the area of the recess. Because of this relationship a softer overall spring stiffness of the bearing is achieved.

When driving on uneven roads or over curbstones, when large relative movements between the journal bearing and the support occur, a relative excess pressure is generated in the recess of the second spring element by introducing a pressurized fluid medium. The second spring element then rests against the adjacent support element in the area of the recess, and thereby stiffens the overall spring characteristic of the bearing. The force acting on the bearing is essentially absorbed only by the second spring element with the recess to which pressure is applied. In this way, vibrations with low frequency and large amplitude are effectively damped. Fine-tuning of the spring characteristic can be achieved by the materials used for the first and second spring elements. Therefore, the materials of the first and second spring elements can have the same composition or different compositions.

The opening cross-section of the recess of the second spring element must be selected to be as large as possible, so that no resonance vibration of the fluid column is generated in the line. Both a liquid or a gas can be used as the pressurized fluid medium. The support element can consist of a non-resilient sleeve.

A pressure greater than atmospheric pressure can be applied to the fluid medium. Application of a relative excess pressure to the recess of the second spring element is particularly practical if a liquid is used as the control medium. To damp large deflections between the journal bearing and the support, such as those which occur when driving over curbstones, the fluid is introduced into the recess of the second spring element under pressure, via a line. Because the second spring element then rests against the support element so as not to move, and because of the incompressibility of the fluid, the first and second spring elements work in parallel, resulting in a comparatively hard spring stiffness. If vibrations with a higher frequency and smaller amplitude are subsequently needed to be insulated, all that is needed is to allow the pressure to escape from the recess, for example via a hydraulic valve.

A pressure below atmospheric pressure can also be applied to the fluid medium. The second spring element can be shrunk and at least partially removed from the support element, especially in the region of the recess. This method is advantageous if a gaseous control medium is used. The gas valve needed for control is an inexpensive component, which benefits the overall economic efficiency of the bearing. By applying a partial vacuum to the recess of the second spring element, it is dented towards the inside and its rigidity is further reduced. Application of a partial vacuum to the space between the first and the second spring elements is also possible. However, it is then necessary that the support element in which the second spring element is arranged be provided with recesses, for example bores. By applying a slight partial vacuum in comparison to the pressure which exists in the recess of the second spring element, the second spring element is made to rest against the circumferential wall of the support element in the area of the recess. However, it should be noted that the first spring element also deforms radially in the direction of the second spring element.

If a partial vacuum is applied to the recess in the second spring element a sufficient size must be ensured so that the gas column does not experience resonance vibrations. If large vibration amplitudes are to be damped, excess pressure has to be applied to the recess in the second spring element. In that condition the second spring element rests against the support element in the region of its recess, and hardens the overall spring stiffness of the bearing.

In one embodiment of the present invention, the support element overlaps below the second spring element in a pot shape on one side, and is provided with a circumferential wall which is cylindrically widened in its diameter in the region of one part of the projecting end. This version of the sleeve allows a good seal of the recess of the second spring element in the region of the feed line of the fluid medium to be made, and allows additional support during application of pressure and during large and sudden stress on the bearing.

It has proven to be particularly advantageous if the axial expanse of the segment cylindrically widened in its diameter is about 0.3–0.5 times as large as the axial length of the support element. When this is the case, the spring element rests at least partially against the circumferential wall of the support element, even if a partial vacuum is applied to the recess.

The first spring element can surround the second spring element in ring shape. Motor bearings structured this way have good usage properties, are simple to produce and have small dimensions in an axial and a radial direction. It is furthermore advantageous when the entire inside region of the bearing, which consists of the support element, the second spring element and the recess, is well protected against external influences. This structure results in an extremely long useful lifetime of the bearing.

The first spring element can be produced in a barrel-shaped form. With this shape, the tension and pressure level of the spring characteristic can be additionally influenced. In addition, little or no mechanical tensile stress acts on the first spring during spring movements in the axial direction, which increases the useful lifetime of the bearing.

In another embodiment, the support element can be formed by the first spring element. This embodiment is advantageous because the bearing consists of very few parts. If pressure is applied to the recess to damp large vibration amplitudes, the circumferential wall of the second spring element rests against the inside surface of the first spring element, which results in hardening of the spring stiffness. This bearing has a simple structure and is particularly easy to manufacture, and is therefore preferably intended for high-volume series production.

The object of the invention is explained in greater detail below, with reference to the attached drawings.

Figure 1:
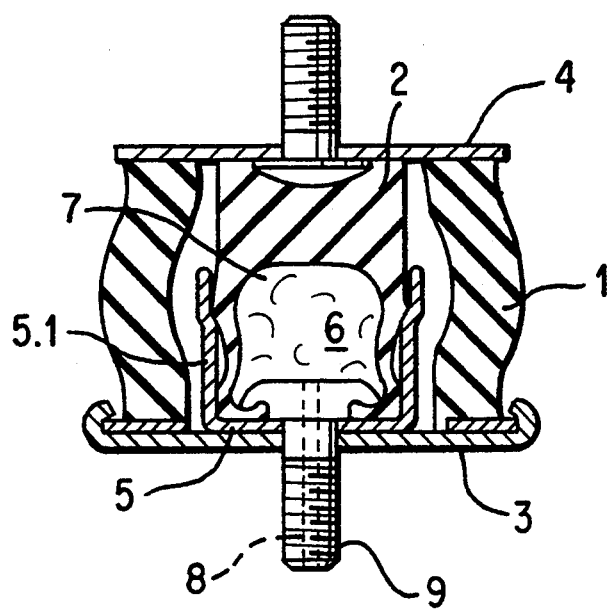
FIG. 1 shows a first embodiment of the present invention, without pressure applied.

The motor bearing shown in FIG. 1 consists of a journal bearing 3, a support 4, and two spring elements 1, 2. The first spring element 1 is structured in the form of a ring, and has an inside diameter which is larger than the outside diameter of the second spring element 2.

The second spring element 2 has a recess 6 which can be filled with a control medium 7 via a feed line 8. In one advantageous arrangement, the feed line 8 forms a component of an attachment element 9. The control medium 7 can be either liquid or gaseous, and the control medium 7 activates the motor bearing. If the control medium is liquid the recess 6 does not have pressure applied to it, as shown in FIG. 1. This causes the second spring element 2 to rest only partially against the support element 5 in the region of its recess 6. If gas is used as the control medium, a partial vacuum can be applied to the recess via the feed line 8 of the connection element 9, to further reduce the spring stiffness.

Figure 2:
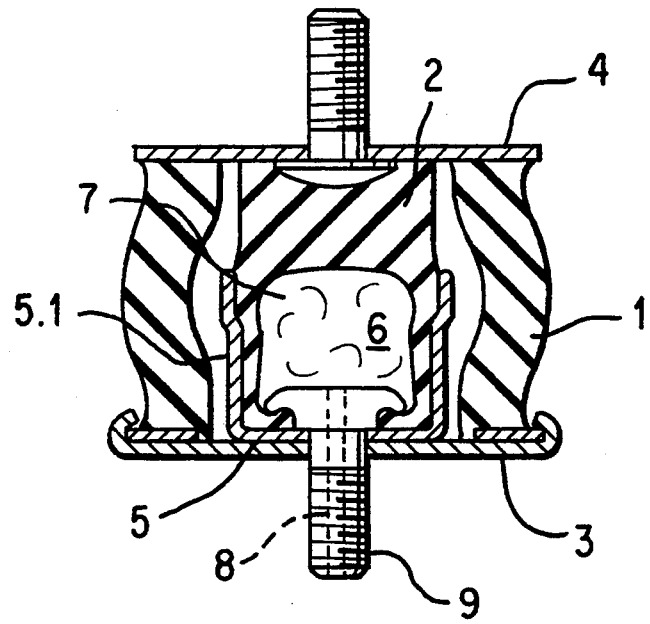
FIG. 2 shows the embodiment of FIG. 1, with pressure applied.

FIG. 2 shows the bearing in FIG. 1, when the recess 6 of the spring element 2 rests completely against the circumferential wall 5.1 of the support element 5. This configuration is caused by the application of excess pressure to damp large vibration amplitudes. In this configuration, both a liquid or a gas can be used as the control medium. When a liquid, an incompressible medium, is used, the first spring element 1 works in parallel with the second spring element 2 in the embodiment of FIG. 2.

Figure 3:
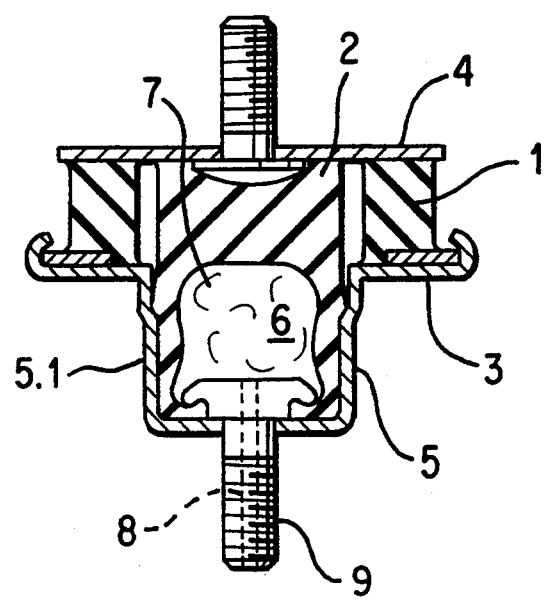
FIG. 3 shows a second embodiment of the present invention, without pressure applied.
Figure 4:
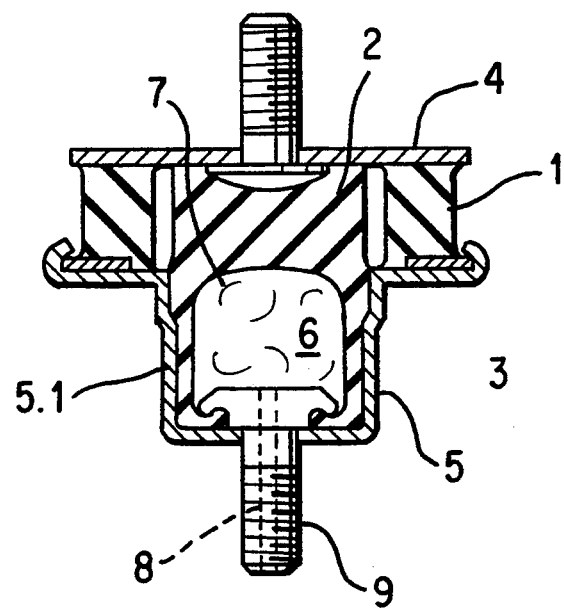
FIG. 4 shows the embodiment of FIG. 3, with pressure applied.

FIGS. 3 and 4 show a second embodiment of the present invention. In this embodiment the journal bearing 3 and the support element 5 are formed in one piece. With this embodiment, smaller dimensions are obtained, especially in the radial direction. FIG. 3, like the motor bearing in FIG. 1, represents the motor bearing of the present invention where the control medium 7 is contained in the recess 6 of the second spring element 2, without application of pressure, or, if the control medium 7 is gaseous, with application of a partial vacuum.

In the bearing shown in FIG. 3, in comparison with the bearing in FIG. 4 which has pressure applied, there is a relatively small spring stiffness in the axial direction, which makes it possible to insulate vibrations at higher frequencies with small amplitude quite well.

FIG. 4 shows the bearing to damp large vibration amplitudes shown in FIG. 3. In this arrangement, a control medium 7 is brought into the recess 6 of the second spring element 2 via the feed line 8 in the attachment element 9. The second spring element 2 rests against the circumferential wall 5.1 of the support element 5 because of the excess pressure in the recess 2. This causes a significant hardening of the overall spring stiffness in comparison with the embodiment shown in FIG. 3, so that large vibration amplitudes are damped without any difficulty.

Figure 5:
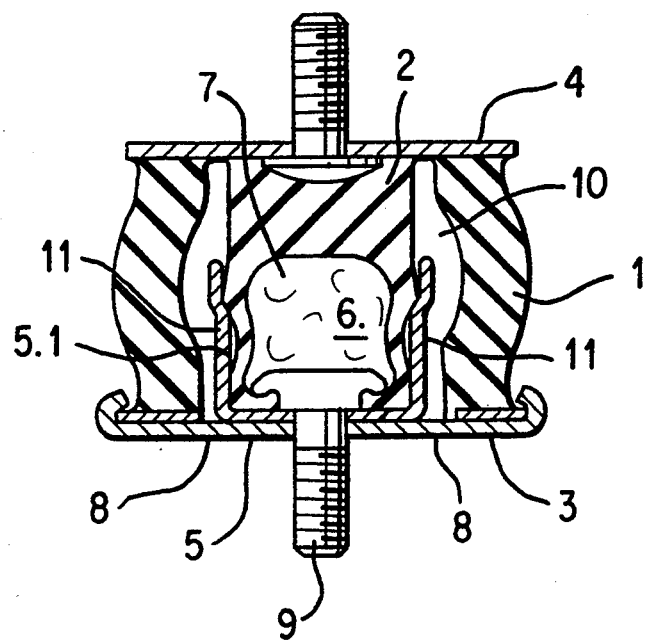
FIG. 5 shows a third embodiment of the present invention, without pressure applied.
Figure 6:
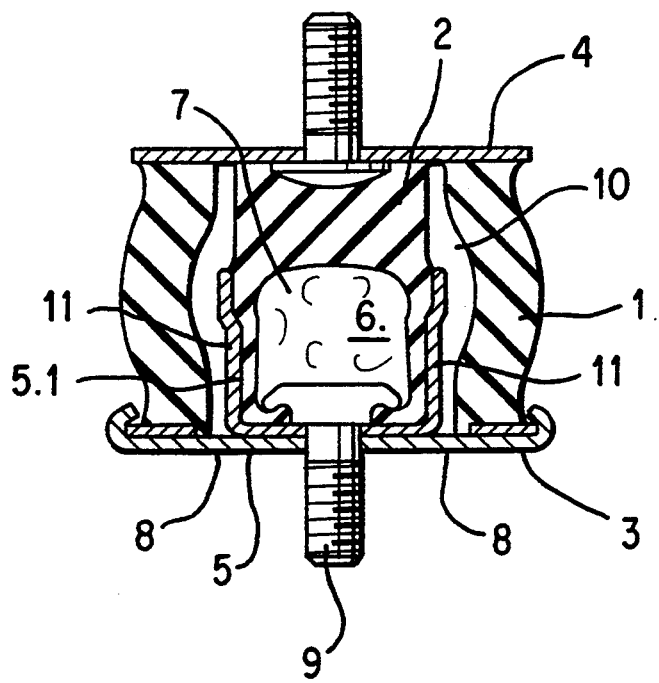
FIG. 6 shows the embodiment of FIG. 5, with pressure applied.

The embodiments of FIGS. 5 and 6 are essentially identical to the motor bearings of FIG. 1 and 2. They only differ by having a different feed for the control medium. In both FIGS. 5 and 6, the control medium is fed into the ring space 10 via the feed line 8. The bearings in the embodiment of FIGS. 5 and 6 are particularly suitable when using a gaseous control medium. In this embodiment, the pressure is applied to the bearing as shown in FIG. 5, either at excess pressure or atmospheric pressure, via the feed line 8 to insulate vibrations at high frequency and small amplitude. The recesses 11 in the circumferential wall 5.1 of the support element 5 constrict the spring element 2 in the radial direction in the region of its recess 6, which results in a soft overall spring stiffness. In this embodiment, in contrast to the embodiments of FIGS. 1–4, the attachment element 9 does not function as a feed line.

If large vibration amplitudes must be damped, the spring element 2 is drawn against the circumferential wall 5.1 of the support element 5 in the area of recess 6 by a relative partial vacuum which acts on the spring element 2 by means of the feed line 8 and the openings 11. This vacuum results in hardening of the overall spring stiffness, as is also the case in the bearings in FIGS. 2 and 4.

Figure 7:
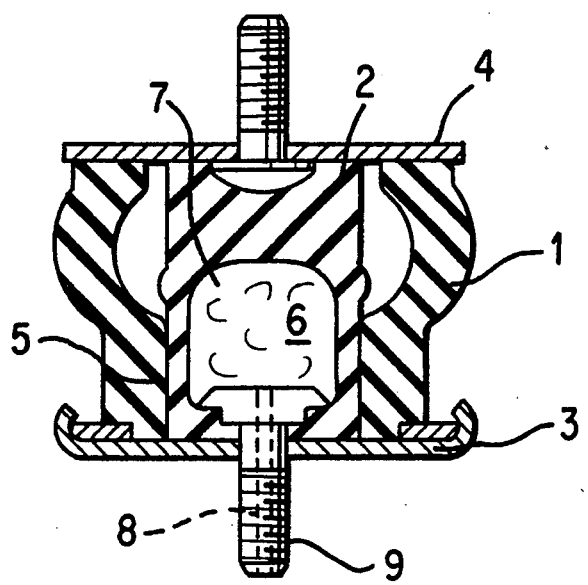
FIG. 7 shows a fourth embodiment of the present invention, in which the support element is formed by the second spring element, without pressure applied.
Figure 8:
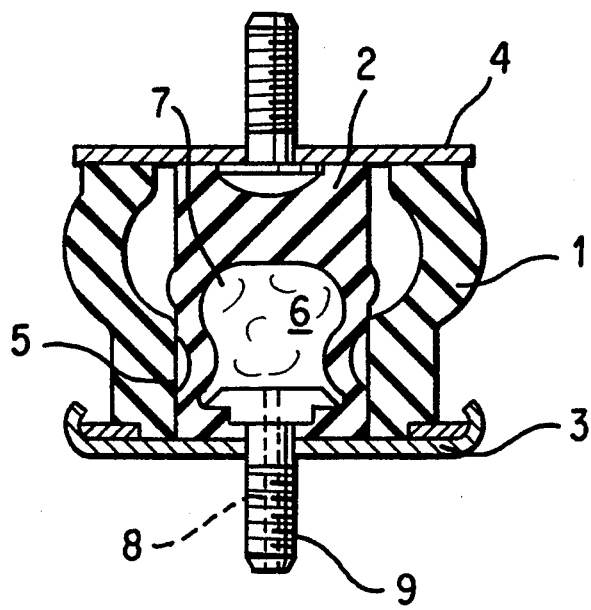
FIG. 8 shows the embodiment of FIG. 7, with pressure applied.

The embodiment of FIGS. 7 and 8 are essentially identical to the motor bearing of FIGS. 1 and 2. The embodiment of FIGS. 7 and 8 only differs in that the support element 5, instead of being a separate element as in the embodiment of FIGS. 1 and 2, is formed by the first spring element 1.

We claim:

1. A controllable bearing comprising:
   a bearing member;
   a support member;
   first and second spring elements, both said first and second spring elements connecting said bearing member and said support member parallel to one another, said first spring element being annular and having an inner diameter which is larger than an outer diameter of said second spring element to define therebetween an annular space, said second spring element having a recess whereby a fluid medium can be fed into said recess; and
   a support element, said support element having a portion surrounding said second spring element in an axial area corresponding to said recess;
   whereby said second spring element expands when said fluid medium is fed into said recess such that a portion of said outer diameter of said second spring element contacts said support element, and whereby both said first and second spring elements provide a force in response to relative displacement between said bearing member and said support member, said force provided by said second spring element being provided even when said fluid medium is not within said recess.

2. The controllable bearing of claim 1, wherein:
   said support element has a first flange extending below said second spring element at one end of said portion of said support element surrounding said second spring element, a portion of said support element being widened in its diameter at an opposite end of said portion of said support element surrounding said second spring element.

3. The controllable bearing of claim 2, wherein:
   an axial length of said widened portion is 0.3–0.5 times an axial length of said support element.

4. The controllable bearing of claim 1, wherein:
   the first spring element surrounds said second spring element in a ring shape.

5. The controllable bearing of claim 4, wherein:
   the first spring element has a barrel-shaped form.

6. The controllable bearing of claim 1, wherein:
   said support element is a non-resilient sleeve.

7. The controllable bearing of claim 1, wherein:
   said fluid medium can be pressurized to a pressure greater than atmospheric.

8. The controllable bearing of claim 1, wherein:
   a partial vacuum can be applied to said recess to thereby reduce an area of said contact between the second spring element and the support element.

9. The controllable bearing of claim 1, wherein:
   the support element is formed by the first spring element.

10. The controllable bearing of claim 1, wherein:
    the first and second spring elements are formed of rubber.

11. The controllable bearing of claim 1, wherein:
    the bearing member and support element are integrally formed.

* * * * *